United States Patent
Schaewen et al.

(10) Patent No.: US 6,304,075 B1
(45) Date of Patent: Oct. 16, 2001

(54) MAGNETIC RESONANCE SENSOR

(75) Inventors: Ralf von Schaewen, Waltersdorf; Juergen Koblitz, Goerlitz, both of (DE)

(73) Assignee: Bic-Niesse GmbH —Business and Innovation Centre in der Euroregion Neisse, Zittau (DE)

( * ) Notice: Subject to any disclaimer, the term of this patent is extended or adjusted under 35 U.S.C. 154(b) by 0 days.

(21) Appl. No.: 09/331,859

(22) PCT Filed: Dec. 27, 1996

(86) PCT No.: PCT/DE96/02513

§ 371 Date: Jun. 28, 1999

§ 102(e) Date: Jun. 28, 1999

(87) PCT Pub. No.: WO98/29712

PCT Pub. Date: Jul. 9, 1998

(51) Int. Cl.[7] .................................................. G01B 7/14
(52) U.S. Cl. ................... 324/207.17; 324/207.13
(58) Field of Search ........................ 324/207.13, 207.17, 324/249, 234, 236, 239, 207.25, 173; 310/155, 68 B

(56) References Cited

U.S. PATENT DOCUMENTS 4,236,093 * 11/1980 Birnbaum ..................... 324/207.13

FOREIGN PATENT DOCUMENTS

| 94 12 381.0 | 8/1994 | (DE) . |
| 195 10 519 A1 | 2/1995 | (DE) . |
| 195 23 373 C2 | 6/1995 | (DE) . |

* cited by examiner

Primary Examiner—Walter E. Snow
(74) Attorney, Agent, or Firm—Reed Smith LLP

(57) ABSTRACT

A magnetic field sensitive sensor whose output signal yields information about the distance, rotational velocity (speed) and direction of rotation of a magnetic field simultaneously. The magnetic field can be generated by a permanent magnet and/or the effect of electric current. Provided is a sensor whose working frequency distinctly exceeds the limit frequency $f_{Gr}$ established in the prior art for magnetic sensors with bistable magnetic elements (BME) as core and whose output signal simultaneously contains information about the distance, speed and rotating direction of a magnetic field. Since the limit frequency $f_{Gr}$ of the large Barkhausen effect (LBE) is determined by objective physical processes, the sensor function, uses a different physical principle. The magnetic resonance sensor differs in function from other magnetic field sensitive sensors which likewise employ an oscillatory circuit through the use of a BME as a core of the sensor coil and the possibility of measuring speed, distance and rotating direction simultaneously.

6 Claims, 1 Drawing Sheet

MAGNETIC RESONANCE SENSOR

BACKGROUND OF THE INVENTION a) Field of the Invention

The invention is directed to a magnetic field sensitive sensor whose output signal with speed-independent amplitude yields information about the distance, rotational velocity (speed) and direction of rotation of a magnetic field simultaneously.

b) Description of the Related Art

Magnetic sensors with speed-independent output voltage in use heretofore rely on the large Barkhausen effect (English-language abbreviation: LBE). The LBE is a pulse-like complete magnetic reversal of special magnetic materials which have a privileged or preferred orientation of magnetic domains due to their composition and method of production. Since two stable states exist for the preferred orientation of the magnetic domains, structural component parts made from LBE materials are also known as bistable magnetic elements (hereinafter abbreviated as BME).

The magnetic reversal takes place within a time frame of roughly 50 µs resulting in a limit frequency for the LBE of $f_{Gr} \approx 20$ kHz. Above $f_{Gr}$, sensors in use heretofore do not generate a usable signal.

Since the magnetic reversal in LBE materials always takes place in a pulse-like manner when an external magnetic field has a frequency f less than $f_{Gr}$, this effect is suitable for use in magnetic sensors. Previously used sensors with LBE materials can be divided into two classes: sensors without a magnetic exciting field and sensors with a magnetic exciting field.

Sensors without a magnetic exciting field are also known as pulse wire sensors (DE 3729949, DE 4107847, DE 3824075, DE 3406871). Devices for measuring velocity (DE 9014753, DE 3112709) can be realized by coupling pulse wire sensors with evaluating electronics. Patents have been applied for in a large number of sensors and devices in which LBE is combined with other physical operating principles (DE 3817704, DE 3008581, DE 3008582, DE 3046804, DE 3008526, DE 3008527, DE 3008560, DE 3008561, DE 3008562, DE 3008581, DE 3008582, DE 3008583, DE 3225499, DE 3225500, DE 342419, DE 3427582, DE 3637320, DE 3538514). However, all of the patented solutions have in common that they rely on the complete course of the LBE, i.e., complete magnetic reversal, and are capable of use only up to the limit frequency $f_{Gr}$ of the LBE.

In sensors with a magnetic exciting field, a constant magnetic reversal of the BME is carried out by the magnetic field of an exciting coil with exciting frequency $f_{Err}$, wherein the condition for the occurrence of the LBE $f_{Err} < f_{Gr}$ must be met again for the exciting frequency. Sensors with a magnetic exciting field contain a sensor coil. The voltage $U_s$ induced in this sensor coil has voltage peaks due to the magnetic reversal of the BME in every half-wave. Depending on the orientation of the external magnetic field, the voltage peaks in every half-wave of the sensor signal can either be strengthened or weakened by an external magnetic field. The working point of the sensors can be adjusted by means of superposing a constant magnetic field on a working point coil (DE 3241018, DE 3718857, DE 4037052, DE 421358).

The magnetic resonance sensor differs in its function from other magnetic field sensitive sensors which likewise employ an oscillatory circuit (DE 8227446, DE 8316996, DE 8517733, DE 9010779, DE 9412765) through the use of a BME as a core of the sensor coil and the possibility of measuring speed, rotating direction and distance of the magnetic field from sensor simultaneously.

OBJECT AND SUMMARY OF THE INVENTION

It is the primary object of the invention to develop a sensor whose working frequency distinctly exceeds the limit frequency $f_{Gr}$ established in the prior art for magnetic sensors with a BME core and whose output signal simultaneously contains information about the distance, speed and rotating direction of the magnetic field. Since the limit frequency $f_{Gr}$ of the LBE is determined by objective physical processes, the sensor function must use a different physical principle.

This object is met, according to the invention, by the magnetic resonance sensor and a process for detecting the position and change in position of objects interacting with magnetic fields (FIG. 1).

The resonator system (sensor) includes the following: a bistable magnetic core (1); at least one exciting coil (3); means serving to generate a magnetic field comprising either a permanent magnet and/or a coil; a high-frequency oscillatory circuit constructed from at least one sensor coil (5) and at least one capacitor (6).

Further, the following are required for operation of the sensor: a high-frequency generator (2); a DC voltage source (8); evaluating electronics (7).

The high-frequency generator (2) feeds an advantageously sinusoidal AC voltage of constant amplitude $U_{Err}$ and constant resonant frequency $f_{Res}$ of the high-frequency oscillatory circuit into the exciting coil (3). As long as an external magnetic field at the location of the sensor has not reached a threshold field strength $H_{Schw}$ characteristic for the sensor, the exciting coil induces a periodic voltage of constant amplitude and identical frequency by means of the bistable magnet core (1) in the sensor coil. A periodic voltage of the resonant frequency $f_{Res}$ with constant amplitude $U_s$ is taken off as sensor output voltage by way of the high-frequency oscillatory circuit. The amplitude of the sensor output voltage is determined by the amplitude $U_{Err}$ of the high-frequency generator (2) and the working point of the sensor. This working point can be established by at least one of the following:

a) permanent magnet, b) working point coil (4) with applied DC voltage $U_{DC}$ of the DC voltage source (8), c) exciting coil (3) with applied DC voltage $U_{DC}$ of the DC voltage source (8).

When an external magnetic field reaches $H_{Schw}$, the working point of the sensor shifts to the steeper area of the induction-field strength characteristic line (B=f(H) characteristic line) of the bistable magnetic core without causing magnetic saturation or magnetic reversal of the core. A voltage is induced in the sensor coil (5) which leads to a change in the amplitude of the sensor output voltage $U_s$. If the magnetic field falls below the value $H_{Schw}$ again, the sensor returns to the established working point. The sensor accordingly emits a pulsed signal for the period during which the value exceeds or falls below $H_{Schw}$, this pulsed signal being evaluated by the evaluating electronics (7). The peak amplitude of the pulse $U_p$ is not dependent on the change over time in the magnetic field and depends only on the maximum magnetic field strength $H_{max}$ at the location of the sensor; the pulse width is proportional to the time period during which the value exceeds or falls below $H_{Schw}$.

The sensor function is based on the following physical processes: The magnetic domains of the LBE materials are also exposed to the force of the exciting magnetic field in the event of high-frequency external magnetic fields where $f_{Err} > f_{Gr}$. However, since the period of the high-frequency exciting field $T_{Err} < (1/f_{Gr})$, the domains cannot completely change their orientation, but rather begin to oscillate at frequency $f_{Err}$ because of their preferred orientation. This collective effect is also still observable when $f_{Err} > 1$ MHz. In magnetic materials without an ordered position of the domains, the oscillation behavior is appreciably poorer because the domains conflict. The collective oscillation of the magnetic domains in LBE materials leads to an oscillation of the magnetic flux density B at frequency $f_{Err}$. Based on the law of inductance, a periodic voltage is induced in a sensor coil at frequencies $n*f_{Err}$. If an additional external magnetic field is superposed on the exciting magnetic field at the location of the sensor, the sensor output voltage $U_s$ can be increased or reduced, depending on the orientation of the additional magnetic field, due to the resulting displacement of the working point of the sensor in the B=f(H) characteristic line of the LBE material. However, the change in the sensor output voltage in a sensor having only an exciting coil, a core of LBE material and a sensor coil is too low to be utilized for technical purposes. Therefore, in order to achieve an effect which can be utilized for measurement techniques, the sensor coil must form an oscillatory circuit with a capacitor C, wherein the resonant frequency of the oscillatory circuit $f_{Res} = f_{Err}$. Through the use of resonance, the changes in the signal of the sensor coil can be increased in such a way that they can be evaluated by measurement techniques.

If there is no external magnetic field acting on the sensor, it supplies a periodic output signal of constant base amplitude $U_G$ at the resonant frequency $f_{Res}$ of the oscillatory circuit integrated in the sensor. When a magnetic field with field strength H acts at the sensor location, where H must be greater than a threshold field strength $H_{Schw}$ characterizing the sensor core, the sensor delivers a pulsed signal with exponential edges and peak amplitude $U_p$ for the duration over which the magnetic field is active.

The speed can be determined from the width of the envelope of the pulse signal, and the distance of the sensor from the center of the magnetic field can be determined from the peak amplitude.

The magnetic resonance sensor can be used as a sensor for contactless measurements of speed, rotating direction and distance and for simultaneous measurement of speed, rotating direction and distance. Measurements of distance, rotating direction and speed can be carried out by nonmagnetic materials with a total thickness of more than 5 cm. The total thickness of the nonmagnetic materials can include several components (e.g., aluminum housing and oil bath). In mechanical engineering and engine construction, conventional speeds of up to $n \approx 10^4$/min can be measured. The sensor is also usable under adverse environmental conditions (e.g., contamination of surfaces) in which optical sensors are no longer functional. Angles of acceleration can also be measured as the result of suitable constructive steps in designing the controlling magnetic field.

Advantageous characteristics of the sensor compared with pulse wire sensors include a substantially higher working frequency of the sensor which is not limited by the LBE. In contrast to pulse wire sensors, the sensor does not need a resetting magnetic field. Its response time to an external magnetic field can lie appreciably below the characteristic time for LBE of 50 μs depending on the quality of the resonant oscillatory circuit. Compared with sensors with a magnetic exciting field, the invention is also characterized by a higher working frequency and a simpler signal structure. The output signal modulated with the exciting frequency can be electronically processed in a simple manner. For example, if an exciting frequency $f_{Err} = 1$ MHz is selected, the time measurement required for speed measurement can be derived by counting the number of periods of the exciting frequency within the envelope of the peak signal of the sensor.

At a constant distance between the sensor and the center of the magnetic field, the width of the peak signal is inversely proportional to the speed. Therefore, the instantaneous speed can be determined from the width of the peak signal, whereas in sensors based on the LBE the speed can only be measured from the time sequence of two peaks, which corresponds to an averaging.

DESCRIPTION OF THE PREFERRED EMBODIMENTS

Figure 1:
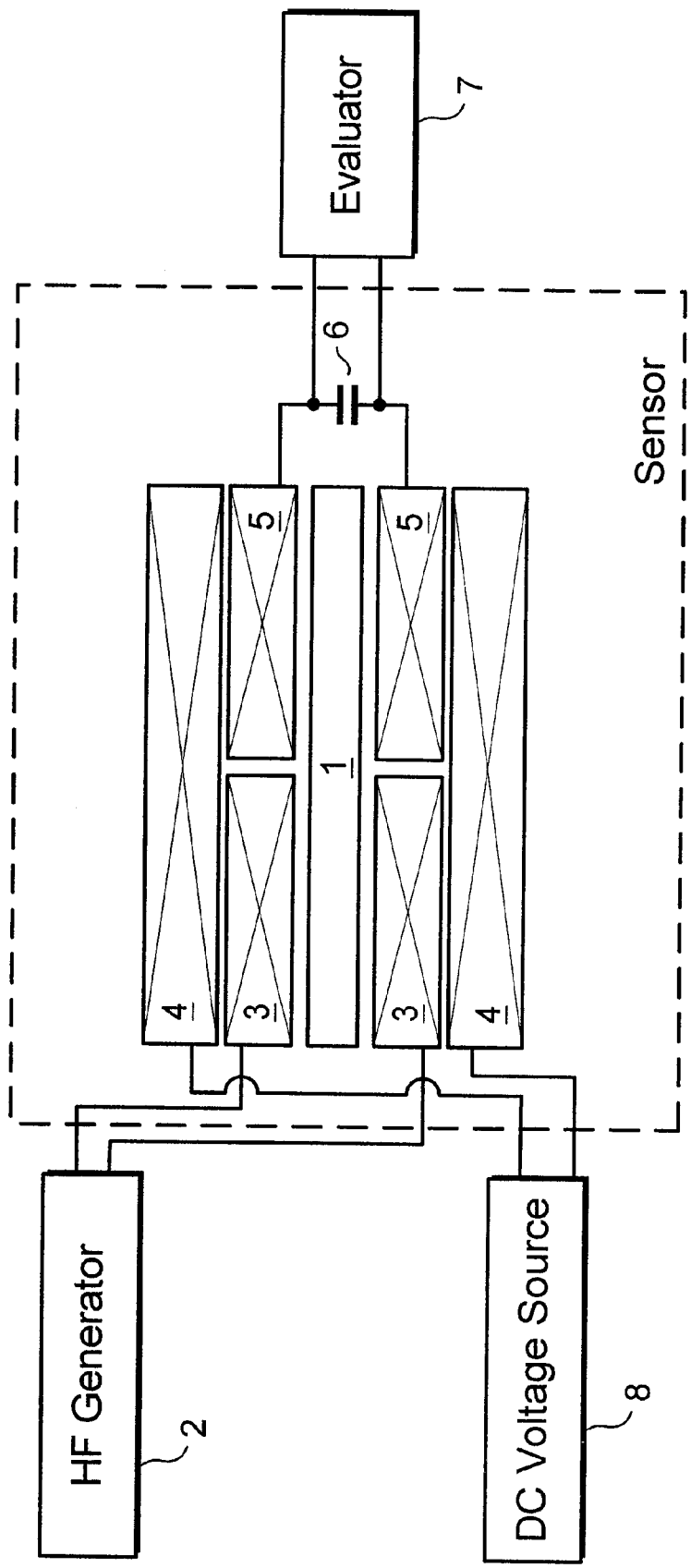
FIG. 1 shows the wiring diagram of the arrangement according to the invention.

The invention is described more fully hereinafter with reference to an embodiment example.

The magnetic resonance sensor includes an exciting coil 3, a sensor coil 5 and a common core 1 which contains a mechanically fixed BME as shown in FIG. 1. The sensor also requires for its operation a high-frequency oscillator generator 2, a dc voltage source 8 and evaluating electronics.

The exciting coil and sensor coil 5 are arranged on the common core 3 in such a way that the exciting coil induces in the sensor coil a signal with a base amplitude of approximately 3V–5V.

The working point of the sensor can be fixed by a working point coil which is likewise arranged on the common core, but the sensor is also capable of functioning without a working point coil.

The sensor coil 5 and a capacitor 6 form the high-frequency oscillatory circuit.

The inductance $L_s$ of the sensor coil 5 is determined by the coil construction. A possible design variant of the sensor coil is a cylindrical coil with 1000 windings of copper wire having a diameter of 0.1 mm. The inductance of the sensor coil should be between 1 mH and 10 mH for resonant frequencies $f_{Res}$ between 500 kHz and 1 MHz.

The capacitance of the capacitor in the oscillatory circuit depends on the desired resonant frequency $f_{Res}$ of the sensor and is to be dimensioned in accordance with the oscillatory circuit formula according to W. Thomson:

$$f_{Res} = \frac{1}{2 \cdot \pi \cdot \sqrt{L_s \cdot C}}.$$

The design of the exciting coil is determined by the desired output voltage of the sensor. This output voltage is determined by the winding ratio $n_{Err}/n_s$ of the exciting coil and sensor coil.

In order to protect it, the sensor must be enclosed by a housing made from nonmagnetic material.

The sinusoidal exciting voltage $U_{Err}$ with exciting frequency $f_{Err}$, where $f_{Err} = f_{Res}$ of the oscillatory circuit, is generated by a high-frequency generator. The temporally constant amplitude of the exciting voltage should lie within the range of 5V–12V.

The output signal of the sensor must be electronically processed. Possibilities include demodulation, peak detection and the evaluation of one or more threshold values.

While the foregoing description and drawings represent the present invention, it will be obvious to those skilled in the art that various changes may be made therein without departing from the true spirit and scope of the present invention.

REFERENCE NUMBERS

1 Bistable Magnetic Core
2 High-frequency Generator
3 Exciting Coil
4 Means for Generating a Magnetic Field
4.1 Working Point Coil
5 Sensor Coil
6 Capacitor
7 Evaluating Electronics
8 DC Voltage Source

What is claimed is:

1. A magnetic resonance sensor, comprising:
   an exciter and resonator system in turn comprising:
   at least one sensor coil and at least one capacitor;
   means for generating a magnetic field;
   at least one exciting coil and said at least one sensor coil being arranged around a common bistable magnetic core comprising one or more parts;
   a bistable magnetic core wherein the exciting coil induces a periodic voltage of constant amplitude $U_s$ and frequency $n*f_{Err}$ via the bistable magnetic core in the sensor coil until the external magnetic field at the location of the sensor does not exceed a threshold field strength $H_{Schw}$ characterizing the sensor;
   and wherein the $f_{Err}$ is at least 1.0 Mhz.

2. The magnetic resonance sensor according to claim 1, wherein said exciting coil and said at least one sensor coil being coaxially arranged around said bistable magnetic core.

3. The magnetic resonance sensor according to claim 1, wherein said means for generating a magnetic field are constructed as at least one working point coil and/or an exciting coil.

4. A process for detecting the position and change in position of objects interacting with magnetic fields, comprising:
   feeding an AC voltage from a high-frequency generator of constant amplitude $U_{HF}$ and constant resonant frequency f of a high-frequency oscillatory circuit comprising at least one sensor coil and at least one capacitor into an exciting coil;
   determining the working point of a magnetic resonance sensor on the induction-field strength characteristic line (B=f(H) characteristic line) by a magnetic field acting on the sensor;
   inducing, by way of the exciting coil, a periodic voltage of constant amplitude $U_s$ and frequency $n*f_{Err}$ via a bistable magnetic core in the sensor coil until the external magnetic field at the location of the sensor does not exceed a threshold field strength $H_{Schw}$ characterizing the sensor;
   allowing the sensor to function at a working point A on the B=f(H) characteristic line before reaching a field strength $H_{Schw}$ characterizing the sensor;
   the sensor passing into working point B on the B=f(H) characteristic line when reaching a field strength $H_{Schw}$ characterizing the sensor, and the amplitude $U_s$ of the sensor voltage and the frequency spectrum accordingly changing in a reproducible manner;
   the sensor passing into working point A on the B=f(H) characteristic line again when the field strength $H_{Schw}$ characterizing the sensor is reached again, and
   obtaining the information needed to detect the position and change in position of objects interacting with magnetic fields from the sensor voltage in evaluating electronics.

5. The process of claim 4, wherein the ac voltage of the high-frequency generator is substantially sinusoidal.

6. A system for detecting the position and change in position of objects interacting with magnetic fields, comprising:
   a high-frequency generator for feeding an AC voltage of constant amplitude $U_{HF}$ and constant resonant frequency f of a high-frequency oscillatory circuit comprising at least one sensor coil and at least one capacitor into an exciting coil;
   means for determining the working point of the sensor on the induction-field strength characteristic line (B=f(H) characteristic line) by a magnetic field acting on the sensor;
   a bistable magnetic core wherein the exciting coil induces a periodic voltage of constant amplitude $U_s$ and frequency $n*f_{Err}$ via the bistable magnetic core in the sensor coil until the external magnetic field at the location of the sensor does not exceed a threshold field strength $H_{Schw}$ characterizing the sensor;
   wherein the sensor is allowed to function at a working point A on the B=f(H) characteristic line before reaching a field strength $H_{Schw}$ characterizing the sensor;
   wherein the sensor passing into working point B on the B=f(H) characteristic line when reaching a field strength $H_{Schw}$ characterizing the sensor, and the amplitude $U_s$ of the sensor voltage and the frequency spectrum accordingly changing in a reproducible manner;
   wherein the sensor passing into working point A on the B=f(H) characteristic line again when the field strength $H_{Schw}$ characterizing the sensor is reached again, and
   evaluating electronics for obtaining the information needed to detect the position and change in position of objects interacting with magnetic fields from the sensor voltage.

* * * * *